US008215145B2

(12) United States Patent
Pong

(10) Patent No.: US 8,215,145 B2
(45) Date of Patent: Jul. 10, 2012

(54) METHOD AND APPARATUS FOR PRODUCING CUT TO LENGTH BARS IN A STEEL MILL

(76) Inventor: David Teng Pong, Hong Kong (CN)

( * ) Notice: Subject to any disclaimer, the term of this patent is extended or adjusted under 35 U.S.C. 154(b) by 28 days.

(21) Appl. No.: 12/771,058

(22) Filed: Apr. 30, 2010

(65) Prior Publication Data

US 2011/0036137 A1  Feb. 17, 2011

(51) Int. Cl.
  B21F 11/00 (2006.01)
  B21B 1/00 (2006.01)
(52) U.S. Cl. .............................. 72/129; 72/131; 72/203
(58) Field of Classification Search ............. 29/412; 72/129, 130, 131, 132, 203, 237, 238, 239, 72/249, 412, 527.6; 83/39, 42
See application file for complete search history.

(56) References Cited

U.S. PATENT DOCUMENTS

| | | | | |
|---|---|---|---|---|
| 2,631,526 A * | 3/1953 | Mathey | ............................. | 100/4 |
| 3,135,076 A * | 6/1964 | Hill | ................................ | 53/399 |
| 3,841,180 A * | 10/1974 | Gutlbauer et al. | ................ | 83/15 |
| 3,871,288 A * | 3/1975 | White | ................................ | 100/2 |
| 3,923,157 A * | 12/1975 | Cavenar | ......................... | 198/360 |
| 4,307,594 A * | 12/1981 | Steinbock | ....................... | 72/201 |
| 4,905,157 A * | 2/1990 | Yamamoto | .................... | 700/167 |
| 5,191,818 A * | 3/1993 | Mantovan et al. | ................ | 83/27 |
| 5,423,200 A * | 6/1995 | Shore | ............................... | 72/201 |
| 5,632,175 A * | 5/1997 | Green et al. | .................... | 72/130 |
| 5,644,941 A * | 7/1997 | Stodt et al. | ..................... | 72/201 |
| 6,240,763 B1 * | 6/2001 | Benedetti | ........................ | 72/239 |
| 6,449,996 B1 * | 9/2002 | Hirabayashi et al. | .......... | 72/12.5 |
| 6,698,266 B2 * | 3/2004 | Brower | ............................ | 72/203 |
| 7,069,759 B2 * | 7/2006 | Shore et al. | ..................... | 72/203 |
| 2008/0019805 A1 * | 1/2008 | Bowler et al. | ................. | 414/171 |
| 2008/0093036 A1 * | 4/2008 | Lin | ................................ | 160/236 |
| 2008/0196236 A1 * | 8/2008 | Giuseppe et al. | ............ | 29/527.6 |
| 2011/0005512 A1 * | 1/2011 | Ruesswick | ..................... | 126/600 |

FOREIGN PATENT DOCUMENTS

| DE | 22 18 041 A1 | 10/1973 |
|---|---|---|
| DE | 36 36 785 A1 | 5/1988 |

OTHER PUBLICATIONS

Machine Translation of German Application 22 18 041 Published Oct. 25, 1973.
Machine Translation of German Application 36 36 785 A1 Published May 5, 1988.

* cited by examiner

*Primary Examiner* — Edward Tolan
*Assistant Examiner* — Homer Boyer
(74) *Attorney, Agent, or Firm* — Ladas & Parry LLP

(57) ABSTRACT

A method and apparatus for producing steel bars that are cut to length in response to a customer order. The method includes producing a continuous length of steel bar from a rolling mill, cutting the continuous length of steel bar into successive segments, each representing a multiple of the length of the bar of the customer order, cutting the segments in in-line cold shears first into two times the length of the bar of the customer order and then in half into lengths equal to the length of the bar of the customer order while maintaining the production of the continuous length of steel bar produced by the rolling mill, and bundling the bars of the length of the customer order for discharge from the mill.

7 Claims, 2 Drawing Sheets

METHOD AND APPARATUS FOR PRODUCING CUT TO LENGTH BARS IN A STEEL MILL

FIELD OF THE INVENTION

The invention relates to methods and apparatus for producing bundles of steel bars which are cut to length and particularly in a continuous operation.

More particularly, the invention relates to producing such bundles which are customer-ordered and are of specific length Steel bars, whether they are for concrete reinforcement or specialty steel, all have a fundamental flaw in the business model: they are all commodities, yet they require substantial capital investment in the setting up of a steel rolling mill for their production. This invention will transform the inherent "commodity" nature of the business into a "mass customization" business, capturing more values in the process. This invention will allow a rolling mill to produce Cut to Length steel bars in-line and at the same time substantially reduce end losses. It can be incorporated into any existing rolling mill with minimum additional investment.

BACKGROUND

Steel bars are supplied in "standard lengths" of 12 m, 15 m, or 18 m and in "standard bundle weights" of generally 2 ton bundles for the same size bars. In the case of concrete-reinforcing bars, they still have to be cut into shorter lengths according to the design of the building structure for a specific column, beam or floor slab. These short specific lengths are generally not designed to be multiples of any standard lengths and therefore will result in end losses when cut. Such cut-to-length operation is normally performed in a "Cut and Bend" yard, on or off the construction site. In a "Cut and Bend" operation, it is typical to expect a 5% loss in the steel bar ends, even with the best computer aided optimization programs. This 5% is very substantial in the building project, especially with the current high prices of steel bars.

The standard lengths of 12 m, 15 m and 18 m are selected to make maximum use of the size of the cargo holds of ships and trucks, while the standard bundle weight also serves for optimizing the capacity of the lifting apparatus of the ships and trucks.

There is an existing technology salt called "Flash Welding" of hot billets in which the tail end of a billet is welded to the front end of the next billet, in-line as they exit from the reheating furnace. Such operation will enable the rolling of bars continuously without any end; this is similar to "sequence casting" in a continuous casting machine. The primary objective of this process of endless rolling is to minimize the head and tail crops in the rolling mill and the short end losses at the cooling bed. In employing this flash welding process together with the very high accuracy of the modern flying shear before the cooling bed, one is able to achieve an accuracy of +50/−00 mm consistently for 120 m long bars on the cooling bed. This is about 0.05% end losses versus an industrial norm of 2.5%.

The flash welding process produces elevated temperature at each of the flash welded joints of the billet. Due to the temperature dependence of draft/spread characteristics, the joints, being at a higher temperature than the rest of the billet, will have more elongation than spread, resulting in "necking"—smaller cross sectional area than the nominal area in the finished product. This means that the area of the joint can fall below the minimum area specified by the Steel Standard.

U.S. Pat. No. 6,929,167 B2 Pong et al. teaches a method which will eliminate such effect of such necking. In the actual operation, gauges were set up in the rolling line to monitor the dimension of the steel bars and the results show that this method is able to maintain a uniform cross section throughout the length of the bar including the flash welded joints.

With the use of flash-welding and uniform cross-section at the weld joints, "In-Line Cut to Length" steel bars are produced by the rolling mills with no loss of production and with substantial reduction in material losses.

Steel bars are generally rolled from a 150 mm (6 inches) square billet of 12 meter (40 feet) length. These billets will be rolled into finished steel bars of various diameters from 50 mm (2 inches) to 10 mm (⅜ inch). Because of the starting weight of the billet is finite, it will end up with various finished lengths of the steel bars of each diameter. The total lengths of the steel bars from each piece of billet will not be exact multiples of the normal finished bar length of 12 m (40 feet) and one will have end losses. This is usually 2.5%. With endless rolling as described above, the billet is welded end to end to form a continuous infinite piece and there will be no end losses.

In the specifications of steel bar standards BS4449 or ASTM 615, a size tolerance is permitted, provided it does not compromise the strength of the steel bar. Typically, BS4449 (2005) such allowable size tolerance is plus or minus 4.5%. The aim is to target at minus 3%, i.e. a lighter bar, but without affecting the strength of the bar at the nominal diameter. With single billet rolling, the minus 3% of the finished bar diameter will end up with a longer end piece by the same 3%. This will go to waste. With the endless rolling of welding the billets, the longer end piece will go into and become part of the next incoming piece and therefore this minus 3% is completely recovered as usable steel and is not waste.

For shipping or trucking reasons, such finished steel bars are usually cut to 12 m (40 feet), 15 m (50 feet), or 18 m (60 feet) lengths. Because of different lengths of columns, beams or slabs, the actual length requirement at the building site is never exactly 12 m, 15 m or 18 m. These bars have to be cut in a separate operation. A typical end loss of cutting to specific bar lengths is 5%.

SUMMARY OF THE INVENTION

An object of the invention is to provide a method and apparatus for cutting any arbitrary specific lengths of steel bars in line in a continuous rolling operation.

A further object of the invention is to enable such method and apparatus to continuously produce short lengths of steel bars which would normally require interruption of the continuous operation.

A particular object of the invention is to provide a method and apparatus which can produce cut to length short pieces according to a customer order, in line, without affecting rolling speed.

In accordance with the invention, this is achieved by correlating a first cut of the continuous bar into a length which is a multiple of the short length of the finished bar and cutting the first cut length into its multiple lengths during continuous operation of the mill.

DETAILED DESCRIPTION

Figure 1:
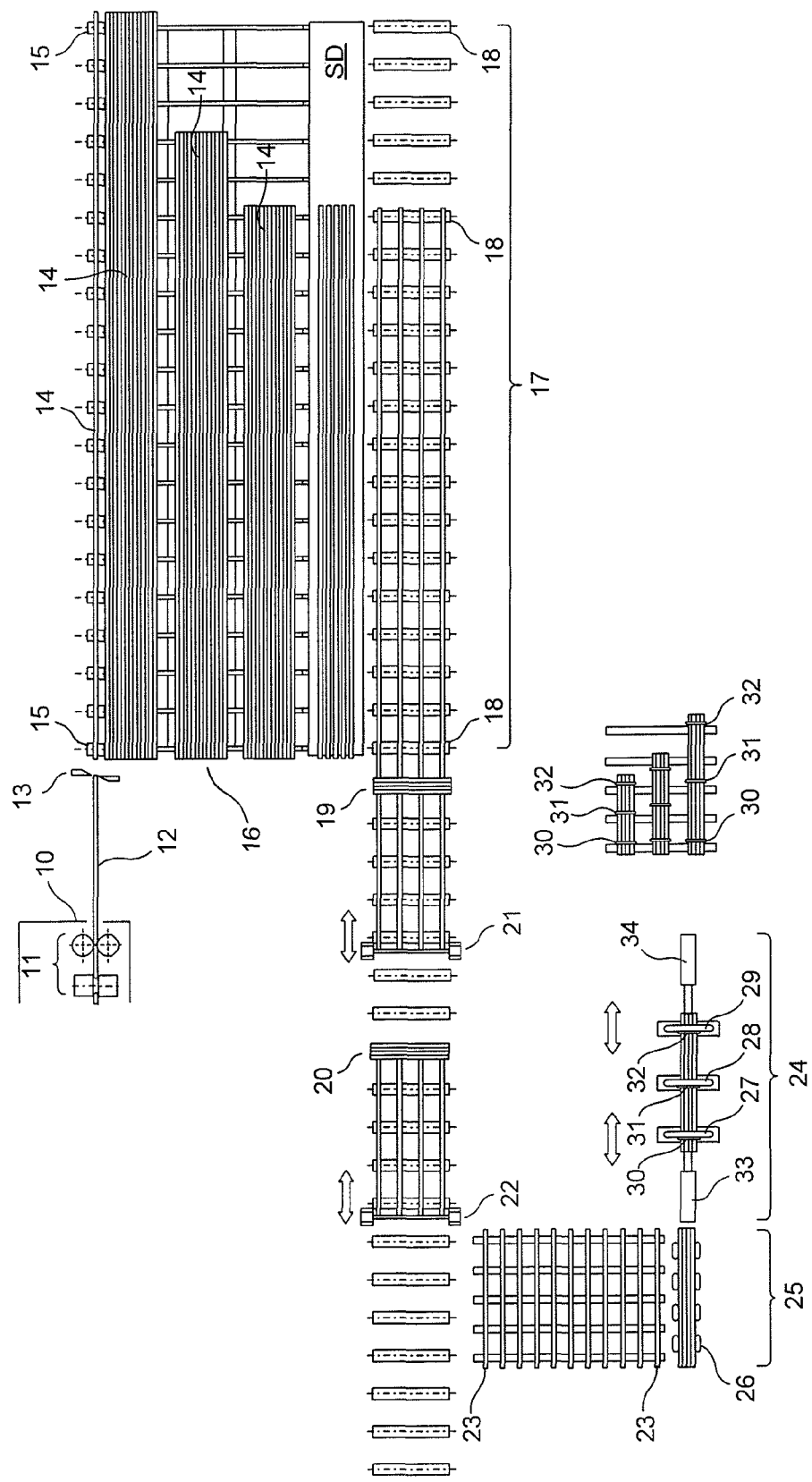
FIG. 1 is a diagrammatic illustration of a portion of a steel mill in which rolled bar is formed into cut to specific length bundles.
Figure 2:
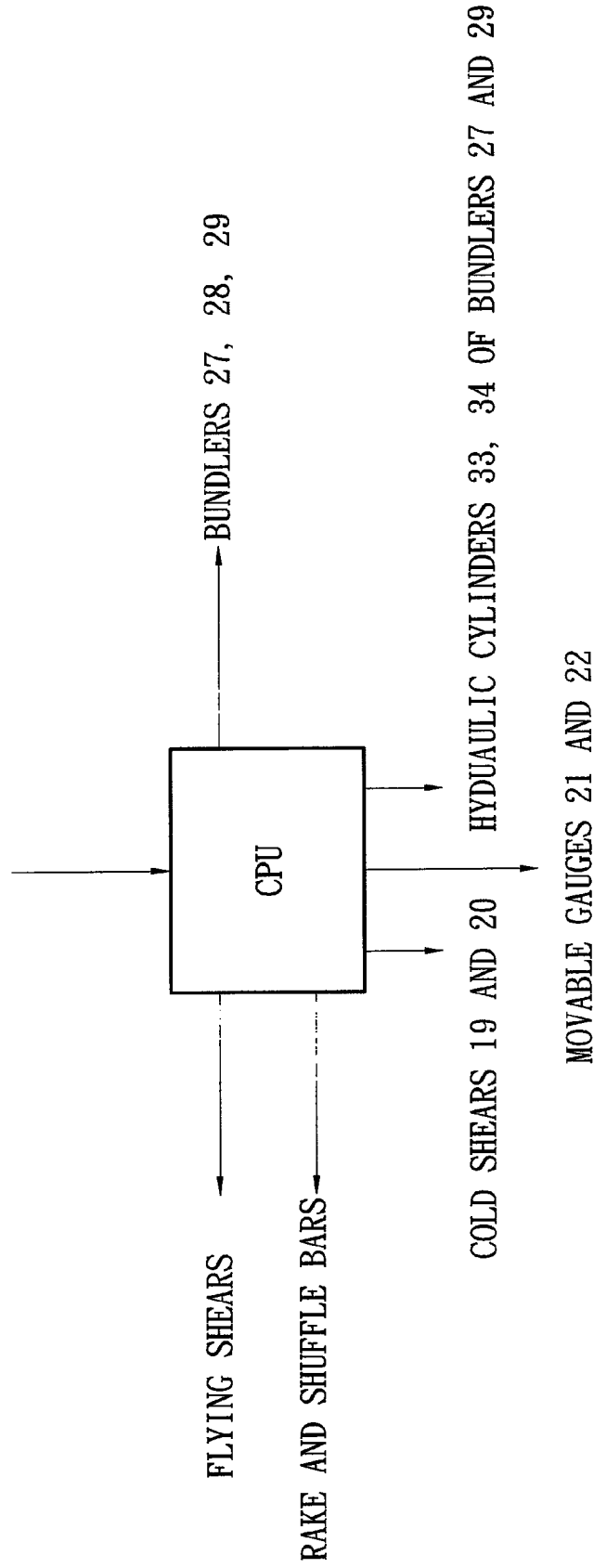
FIG. 2 diagrammatically shows a central processing unit (CPU) which controls operation to form the cut to length bundles.

In FIG. 1 there is shown the exit end 10 of a rolling mill 11 from which rolled bar 12 is continuously discharged at a determined high rate of speed. The rolled bar 12 has been rolled from continuous billet joined front to rear and has been hot rolled in the rolling mill. Downstream of the end 10 of the rolling mill is a flying shear 13 which is activated by a central processing unit (CPU) to cut the bar 12 on the fly and form a cut bar 14 of a given length which is deposited on the rollers 15 of a roller table 16.

As previously explained, current practice is limited to producing bars at the end of the mill of lengths of about 120 m as these are the minimum lengths which the current mill construction can be produced at the high rate of rolling speeds.

The invention permits producing specific arbitrary shorter lengths without reducing the production rate and in particular cutting the length of the bars to the customer order in correspondence to the length needed on the job thereby completely eliminating end cut waste on the job site as well as the need for production cutting at the job site. This will be explained more fully later.

The cut bar 14 is then displaced laterally into a notch in a cooling bed 16 to undergo cooling. The bar 14 is advanced stepwise, notch by notch until it reaches the last notch where it is now cooled and ready to be displaced laterally to a shuffle device SD where a given number of bars e.g 10 or so are collected and formed in a layer of a batch of bars 14.

The construction and operation of the cooling bed and shuffle device is conventional and not described in detail.

The batch of bars 14 on the shuffle device are then moved sideways onto a roller table 17 disposed adjacent to the shuffle device SD. The roller table 17 has rollers 18 which are driven to advance the batch 14 of bars in reverse to the direction it was advanced on the roller table 16.

In order to keep up with the production rate and make the short cut-to-length cuts, two cold shears 19,20 and respective movable gauges 21, 22 are placed in sequence along the roller table 17 to cut the bars 14 into the desired lengths. The cold shears are massive in size to develop forces of 1000 tons or more and they are fixedly secured in a rigid foundation. The two cold shears are secured at a spacing of 20 meters to handle the largest contemplated cut-to-length size Specifically, the bars 14 are moved to a stopped position controlled by the gauge 21 at which cold shear 19 is spaced at a distance from the end of the bars by an amount equal to twice the length of the desired cut-to-length piece. The cut pieces advance to the gauge 22 at which the cold shear 20 cuts the pieces in half to the final desired length. When both cold shears 19, 20 have cut the bars, there are pieces 23 equal to the desired cut length. The movable gauges 21, 22 permit adjustment of the position at which the cold shears cut the bars 14 to change the length of the pieces to be cut. By this double cut of the bars, the rate of production can be maintained. Also, when the length of the cut pieces is to be changed for a subsequent batch, the movable gauges are adjusted to correspond to the desired new length.

The cut to length pieces are next moved sideways to a bundling station 24 where the pieces 23 are bundled and made ready for shipment.

The bundling station 24 includes a roller table 25 on which the cut pieces 23 are deposited. The pieces 23 advance into a conventional collector 26 where rollers are arranged in a predominantly circular array to collect the pieces in a circular bundle.

In order to tie the bundle of cut pieces when they are of short length i.e. of substantially less than 12 m e.g. 8 m or less, three spaced ties are needed. When the length of the short pieces is changed based on a new customer order, the spacing or pitch of the ties must be changed correspondingly. Furthermore, according to the invention, the tying operation is carried out in one stop to keep up with the mill speed. Generally, two end ties are made at a given distance from the ends of the bundle and a central tie is made midway therebetween. The collected pieces are fed into three spaced conventional bundlers 27, 28, 29 which tie the bundle of pieces at ties 30, 31, 32 at appropriate spaced locations. The ties 30, 31, and 32 are made simultaneously and the bundle is then advanced from the bundling station 24.

In accordance with the invention, the first and third bundlers 27 and 29 are movably supported so that they can be quickly adjusted to adjust the space when the length of the cut piece is changed. The movable bundlers 27, 29 are drivingly connected to respective hydraulic cylinders 33, 34 which are connected to the CPU to control the position of the bundlers.

The invention makes it possible to be able to provide cut to specific short lengths required by the building site and recover all the losses associated with existing technology and at the same time, does not slow down the production of the mill.

A key component of the invention is the CPU which controls with the charging of the billets, the following elements
a) flying shears 13
b) rake and shuffle bars
c) roller table 17
d) roller table 25
e) cold shears 19, 20
f) gauge stops 21, 22
g) bundlers 27, 28, 29
h) hydraulic cylinders 33, 34

EXAMPLE

The following Example will explain in detail the operation of the mill to obtain cut-to-length bars.

The weight of each billet is recorded as it is being charged into the reheat furnace. These charge weights will be compared with the end product weights to obtain material losses for that shift, which will primarily be oxidation losses. There will be minimal front end crop losses and no tail end crop losses because of the use of the flash welding proves as explained previously.

The operator keys in the exact number and exact specific lengths as per the order of that particular size of bar being rolled for the command of the flying shear 13.

With conventional methods;

If one were to cut for an order of 6.4 m bar from a standard length of 12 m, one will end up with a 6.4 m bar and a short piece of 5.6 m.

If it were to cut from a standard length of 15 m, it will have two pieces of 6.4 m and a short piece of 2.2 m.

If it were to cut from a standard length of 18 m, it will have two pieces of 6.4 m with a short piece of 5.2 m.

These short lengths are usually kept on the side for another part of the building project which may require a length shorter than these end cuts, or they will be disposed of as scrap. All these options are undesirable.

With the invention, the operator will set in the programable logic of the CPU sequence for the flying shears 13 to produce lengths of cut as multiples of the specific lengths of the final product. Assuming that a typical cooling bed is able to accept 120 m long bars, the programable logic at the CPU will allow the operator to set the flying shear to cut lengths of 115.2 m, which is 18 multiples of 6.4 m. If the order is for 500 pieces of 6.4 m, the setting will be 27 cuts of 115.2 m with the last cut of 89.6 m, making a total length of 3,200 m or 500 pieces of 6.4 m.

A command signal to the cooling bed will move a double step after the last cut of 89.6 m to separate this batch from the next.

If the next order is for 5.2 m, the operator will input 109.2 m, which makes 21 pieces of 5.2 m to follow the previous 6.4 m batch. If this order of 5.2 m is, for example, 400 pieces, the number of cuts for 109.2 m, will be 18, with the last cut at 114.4 m. The total length of this order is 2,080 m making 400 pieces of 5.2 m finished length. Again a double step motion of the cooling bed will separate this new batch from the next. The same process will be repeated for any other specific lengths and quantities for the same size bar.

As each batch of bars leaves the cooling bed 16 by the raking motion and the shuffle bars the batch of bars will be side shuffled to roller table 17 in the conventional way. Each batch will be conveyed separately to the cold shears 19, 20 for final cutting to the ordered lengths. In this case, the first batch will be 115.2 m with the last piece 89.6 m, for a final cut length of 6.4 m and the second batch will be 109.2 m with the last piece 114.4 m, for the final cut length of 5.2 m. The cutting capacity of the cold shear will determine how many bars from the same batch length are presented for cutting each time. It is worth noting that since the tail end of each bar running to the cooling bed is being run in reverse direction to the cold shears, these tail ends having been cleanly cut by the flying shears 13 will not require head trimming by the cold shears. This contributes to additional material saving.

Two stationary in-line cold shears 19, 20 are utilized in order to keep up with the rolling capacity of the mill for the cutting of such short bars. Each cold shear will have its respective movable gauges stop 21, 22. In this example, the first a gauge stop 21, will be set for 12.8 m, which is 2×6.4 m, and the cut bars will move along to the next gauge stop 24 which has been set for 6.4 m and are cut to 6.4 m by the second cold shear. After completing each batch of specific lengths, the gauge stops 21, 22 will be moved automatically by a signal from the CPU to the next required length and locked. In this example, the first gauge stop 21 will move to 10.4 m, which is 2×5.2 m, while the second gauge stop 22 will move to 5.2 m.

Steel bars of each specific length will be collected separately in a conventional manner and tied into bundles in bundle weights convenient for handling. Additional commands in the programable logic of the CPU will be sent to the in-line bundlers 27, 28, 29 so that the ties will be made at the appropriate spaced positions along the length of the short bars. The first and third bundlers 27, 29 are movable and the central bundler 28 is fixed so as to set the proper pitch for the ties and enable all ties to be made simultaneously. Each tied bundle is weighed and tagged with the appropriate bar code label specifying contract number, size, length, number of pieces and bending schedules. It may be necessary to install more bundling stations to increase the bundling capacity for such short bars to match that of the production capacity of the mill.

In a separate operation, these bundles of specific length are transferred to a bending yard near the mill. This bending yard will make the necessary bending of each of the bars to a bending bar schedule. These cut and bend bars will then be ready to be delivered to the construction site for installation in the various beams or columns or slabs.

In total, the rolling operation of the invention should save as much as 10% of losses in conventional manufacture and be able to supply cut to length bars in a specific number to customers with no additional cost.

Although the invention has been described with reference to a disclosed embodiment, it will become apparent to those skilled in the art that numerous modifications and variations can be made within the scope and spirit of the invention as defined in the claims.

What is claimed is:

1. A method of producing steel bars that are cut to length in response to a customer order, said method comprising the steps of:
    producing a continuous length of steel bar from a rolling mill,
    cutting said continuous length of steel bar into successive segments, each representing a multiple of the length of the bar of the customer order,
    cutting said segments in two in line cold shears first into two times the length of the bar of the customer order and then in half into lengths equal to the length of the bar of the customer order while maintaining the production of the continuous length of steel bar produced by the rolling mill, and
    bundling in an adjustable bundler which is adjusted to the length of the bars of the length of the customer order for discharge from the mill while maintaining the production of the continuous length of steel bar produced by the rolling mill whereby production of the continuous length of steel bar can continue without interruption, wherein when a change of length of the bar by a customer order is made, the length of said segments is changed and said segments are repositioned relative to said cold shears to produce the bar length corresponding to the changed length of the customer order and wherein a CPU controls the cutting of the continuous length of steel bar by a flying shear and the cutting of the bar by the in line cold shears and comprising adjusting the position of said segments relative to said cold shears to cut the segments to the desired lengths in response to signals from said CPU and wherein the bundling of the steel bars is effected simultaneously in three in line bundlers, one of which is stationary and the other two of which are moved to position in response to a signal from said CPU.

2. A method as claimed in claim 1, wherein said cold shears have respective gauge stops, said CPU producing signals to move said gauge stops to positions at which the cold shears cut the segments to the desired length of the customer order.

3. A method as claimed in claim 2 wherein said flying shear cuts said continuously produced billet from the rolling mill into long lengths equal to a multiple of the length of the customer order whereafter the long lengths are cut by said two cold shears first into segments twice the length of the customer order and then in half to the customer order and then bundled in the adjustable bundler for discharge thus providing bar lengths of the customer order without any waste and end losses from the continuous billet produced by the rolling mill.

4. A method as claimed in claim 1 wherein when a change in length of the cut steel bars according to a new customer order is to be made directly and continuously following an existing order, said method comprising,
    adjusting the cutting of the steel bar into segments corresponding to the new order, displacing the position of the cold shears relative to the cut segments to produce lengths of the bars corresponding to the new customer order, and bundling the bars in adjusted positions corresponding to the new customer order while continuing to maintain the production of the continuous length of the steel bar produced by the rolling mill without interruption.

5. Apparatus for producing steel bars that are cut to length in response to a customer order, said apparatus comprising:

a rolling mill for producing a continuous length of steel bar;

a flying shear at an exit end of said rolling mill;

a CPU connected to said flying shear to cut said continuous length of steel bar into lengths each representing a multiple of the length of the bar of the customer order, two in line cold shears to which said lengths are continuously fed, said cold shears having respective adjustable gauge stops, said cold shears and said gauge stops being connected to said CPU which positions and operates said cold shears to so that one cold shear cuts said lengths into pieces equal to two times the length of the bar of the customer order and the other cold shear cuts the cut pieces in half to produce bars cut to the length of the customer order, said cold shears being operated in time with the production of the continuously produced length of bar, and a bundling station positioned to receive the cut bars from the cold shears for producing bundles of the bars of the length of the customer order, said bundling station including three in-line bundlers of which the first and third are movable in response to signals from said CPU while the second is stationary, said CPU being connected to the gauge stops of the cold shears and to the movable bundlers to position them so that different lengths of bars of a customer order can be cut by the cold shears and bundled by the bundlers while maintaining production of the continuous length of steel bar without interruption.

6. Apparatus as claimed in claim 5 wherein the first and third bundlers are end bundlers and the second bundler is a center bundler.

7. Apparatus as claimed in claim 5 comprising a rolling table on which the cut lengths of steel bars are advanced to the cold shears and the bundlers, said table having a direction of travel opposite the direction of travel of the steel bar coming from the rolling mill.

* * * * *